United States Patent Office 3,060,141
Patented Oct. 23, 1962

3,060,141
SOLUTION OF POLYPYRROLIDONE IN AQUEOUS FORMIC ACID AND METHOD OF PREPARING SAME
William B. Black, Decatur, Ala., assignor, by mesne assignments, to Monsanto Chemical Company, a corporation of Delaware
No Drawing. Filed Aug. 20, 1959, Ser. No. 834,965
7 Claims. (Cl. 260—29.2)

This invention relates to new compositions of matter, and more particularly to new and useful compositions of matter comprising polypyrrolidone.

This application is a continuation-in-part of copending application Serial No. 652,700, filed April 15, 1957, and entitled "Polypyrrolidone Compositions."

The polymer polypyrrolidone may be produced as a fine molding powder, a dry cake or in coarse granular form. It is a thermo-plastic polymer with a melting point between 250° C. and 260° C. While the polymer is insoluble in most ordinary solvents and water, it is known to be soluble in solutions of formic acid containing not more than two percent water when employed in a concentration of at least 25 percent based on the total amount of acid present in the solution. These specific limitations, which are taught in the art to be critical in preparing solutions of polypyrrolidone, present undesirable limitations. For example, anhydrous formic acid is more expensive. Commercial formic acid, if employed, must be converted to its anhydrous form thereby necessitating an extra step in preparing polypyrrolidone solutions and the employment of elaborate equipment to carry out this step. Furthermore, great care must be taken to maintain the proper ratio of at least 25 percent concentrations of polymer with respect to the formic acid employed in order to prepare solutions which are suitable for the preparation of shaped articles, such as fibers, films, filaments, and the like.

It is a primary object of the instant invention to provide compositons comprising polypyrrolidone and aqueous formic acid containing at least 10 percent water. It is another object of the invention to provide aqueous formic acid solutions of polypyrrolidone which are readily and economically adaptable to being converted into shaped articles by conventional methods. It is still another object of the present invention to provide a process for producing new and useful compositions comprising polypyrrolidone and aqueous formic acid. Other objects and advantages of the instant invention will be apparent from the description thereof hereinafter.

It has unexpectedly been found that polypyrrolidone can be dissolved in aqueous formic acid containing from 10 to 50 percent water to give clear, homogeneous solutions suitable for the formation of shaped articles therefrom. As used throughout the instant specification and claims, "aqueous formic acid" is intended to mean a solution containing 10 to 50 percent of water and 50 to 90 percent of formic acid, said percentages being by weight. The polymer or polypyrrolidone may be dissolved in the aqueous formic acid in amounts ranging from 6 to 40 percent, based on the weight of the solvent or aqueous formic acid. It is to be understood, of course, that the polymer concentration is depenedent upon temperature of dissolution, molecular weight of the polymer, and the like. Usually, however, particularly when preparing solutions to be converted into filaments and fibers, a concentration of 15 to 35 percent polypyrrolidone, based on the weight of the solvent, is satisfactory. The concentration of polymer in the composition will vary depending upon the end use thereof, that is, whether coating compositions are to be made, lacquers, films, fibers, filaments, ribbons, tubes, wires, and the like.

The polypyrrolidone compositions which are useful in the practice of the present invention have a widely varying range of intrinsic viscosity indicating a wide range of molecular weight. For example, polypyrrolidone having an intrinsic viscosity in a range of about 0.9 to 8.5, indicating molecular weights of approximately 8500 to 500,000 are useful for the preparation of films, fibers and filaments. It would be readily apparent to those skilled in the art that like polymers having a molecular weight greater than 500,000 may also be employed in the practice of the present invention since even polymers in this high molecular weight range go into solution in the solvents of this invention with great facility. On the other hand, like polymers having an intrinsic viscosity less than 0.9, that is, those having a molecular weight less than about 8500 are useful in the formation of lacquers, thin coatings and the like. It will be readily apparent to those skilled in the art that the specific amount of any particular polymer which can be dissolved in a particular solvent will vary within wide limits depending upon concentration thereof in the solvent, the temperature of this solution, the molecular weight of the polymer and the like.

The polypyrrolidone compositions described herein are particularly adapted for use in the manufacture of shaped articles such as filaments, fibers, films and the like. Various methods are known for converting polypyrrolidone compositions of the present invention into filaments and fibers such as the so-called dry-spinning and wet-spinning methods. In the dry-spinning method the polypyrrolidone solution is extruded through a spinneret and the resulting filament is subjected to a heated atmosphere to take out the volatile solvent. In the wet-spinning method, a solution of polypyrrolidone is extruded into a bath containing a non-solvent for the polypyrrolidone. The wet-spinning method is generally more economical and can be carried out at lower temperatures. Therefore, plasticizers and other agents may be added with a minimum tendency toward discoloration and decomposition. They can be readily incorporated in a polypyrrolidone solution at a low temperature. Solutions offer the further advantage in that they may be easily cast into films or coatings of uniform thickness. With respect to employing the wet-spinning method, a variation thereof may also be employed in practising the instant invention. This is known as the dry-jet wet-spinning method in which the spinneret is not submerged in the coagulating bath, but, on the contrary, is disposed above the surface thereof and out of contact with the bath solution. As the fibers are extruded through the spinneret they travel for a short distance through the air and subsequently into the coagulating bath solution.

If it is desired to produce shaped articles from the polypyrrolidone solutions of the present invention which have a modified appearance or modified properties, various agents to accomplish these effects may be added to the polypyrrolidone solutions prior to fabrication of the articles without any ill effects thereon. Such added agents might be plasticizers, pigments, dyes, anti-static agents, fire-retarding agents, and the like.

The following examples are intended to illustrate the new compositions of the instant invention more fully, but are not intended to limit the scope of the invention, for it is possible to effect many modifications therein. In the examples, all parts and percents are by weight unless otherwise indicated.

*Example I*

1 gram of polypyrrolidone having an intrinsic viscosity of 1.73 (indicating a molecular weight of approximately 15,000) was dissolved in 2.0 grams of a solution containing 50 percent formic acid and 50 percent water at room temperature to give a clear colorless moderately viscous solution of 33⅓ percent solids. The solution was suitable for the casting of films or for the preparation of fibers.

Example II 1 gram of polypyrrolidone having an intrinsic viscosity of 1.73 (indicating a molecular weight of approximately 15,000) was dissolved in 2.0 grams of a solution containing 75 percent formic acid and 25 percent water at 35° C. to give a clear colorless solution of 33⅓ percent solids. The solution was suitable for spinning filaments and casting films.

Example III 1 gram of polypyrrolidone having an intrinsic viscosity of 1.73 (indicating a molecular weight of approximately 15,000) was dissolved in 2.0 grams of a solution containing 65 percent formic acid and 35 percent water solution at 70° C. to give a clear colorless solution containing 33⅓ percent solids. The solution was suitable for spinning filaments and casting films.

Example IV 1 gram of polypyrrolidone having an intrinsic viscosity of 1.73 (indicating a molecular weight of approximately 15,000) was dissolved extremely easily in 4.0 grams of a solution containing 75 percent formic acid and 25 percent water solution at 28° C. to give a clear colorless solution containing 20 percent solids. The solution was suitable for spinning filaments and casting films.

Example V 1 gram of polypyrrolidone having an intrinsic viscosity of 1.73 (indicating a molecular weight of approximately 15,000) was dissolved in 3.0 grams of a solution containing 75 percent formic acid and 25 percent water solution at 28° C. to give a clear colorless solution containing 25 percent solids. The solution was suitable for spinning filaments and casting films.

Example VI 1 gram of polypyrrolidone having an intrinsic viscosity of 1.73 (indicating a molecular weight of approximately 15,000) was dissolved in 3.0 grams of a solution containing 65 percent formic acid and 35 percent water solution at 50° C. to give a clear colorless solution containing 25 percent solids. The solution was suitable for spinning filaments and casting films.

Example VII 1 gram of polypyrrolidone having an intrinsic viscosity of 1.73 (indicating a molecular weight of approximately 15,000) was dissolved in 2.0 grams of a solution containing 85 percent formic acid and 15 percent water solution at 28° C. to give a clear colorless solution containing 33⅓ percent solids. The solution was suitable for spinning filaments and casting films.

Example VIII 1 gram of polypyrrolidone having an intrinsic viscosity of 1.73 (indicating a molecular weight of approximately 15,000) was dissolved in 7.0 grams of a solution containing 85 percent formic acid and 15 percent water solution at 28° C. to give a clear colorless solution containing 12½ percent solids. The resultant solution was suitable for spinning filaments and casting films.

Example IX 1 gram of polypyrrolidone having an intrinsic viscosity of 1.063 (indicating a molecular weight of approximately 11,000) was dissolved in 2.5 grams of a solution containing 90 percent formic acid and 10 percent water at 55° C. to give a clear colorless solution containing 28½ percent solids. The solution was suitable for spinning filaments and casting films.

Example X 0.5 gram of polypyrrolidone having an intrinsic viscosity of 1.063 (indicating a molecular weight of approximately 11,000) was dissolved in 7.0 grams of a solution containing 90 percent formic acid and 10 percent water at 28° C. to give a clear colorless solution containing 6.67 percent solids. The solution was suitable for spinning filaments and casting films.

Example XI 1 gram of polypyrrolidone having an intrinsic viscosity of 1.063 (indicating a molecular weight of approximately 11,000) was dissolved in 1.5 grams of a solution containing 90 percent formic acid and 10 percent water at 55° C. to give a clear colorless solution containing 40 percent solids. The solution was suitable for spinning filaments and casting films.

Example XII 1.0 gram of polypyrrolidone having an intrinsic viscosity of approximately 0.98 corresponding to a molecular weight of approximately 9,500 was easily dissolved in 4.0 grams of 75 percent formic acid at 28° C. to give a clear colorless solution containing 20 percent solids. This solution was suitable for spinning filaments and casting films.

Example XIII 0.75 gram of polypyrrolidone having an intrinsic viscosity of 8.5 and a weight average molecular weight of 450,000±50,000, as determined by conventional light scattering techniques on solutions of the polymer containing up to 1.2 grams per liter of the polymer in a solvent consisting of 90 percent formic acid containing 0.5 mol of sodium formate per liter, was dissolved in 4.25 grams of 85 percent formic acid at 28° C. to give a clear, colorless, very viscous solution containing 15 percent solids.

Example XIV 0.25 gram of polypyrrolidone having an intrinsic viscosity of 0.48 corresponding to a molecular weight of approximately 3,500 was very easily dissolved in 1.0 gram of 75 percent formic acid at 28° C. to give a clear, colorless solution containing 20 percent solids. The solution was suitable for lacquers, coatings and the like.

The polypyrrolidone compositions of this invention can be usefully employed in the coating field, for example, in the coating of textile fabrics. Thus, a fabric can be coated and/or impregnated with the polypyrrolidone solutions described herein and treated, that is, soaked in a non-solvent for the polypyrrolidone in order to precipitate the polypyrrolidone in and on the fabric. Metals, paper and impervious films may also be coated with the polypyrrolidone compositions of this invention by conventional and well-known procedures. One of the principal advantages of the instant invention is that it provides polypyrrolidone compositions which are readily convertible to useful shaped articles by the wet or dry-spinning methods. Another particularly important advantage is that commercial formic acid may be used in preparing pyrrolidone solutions, thereby eliminating the step of converting the formic acid to its substantially anhydrous form. This results in decreased costs and the elimination of the elaborate equipment necessary to convert formic acid to its substantially anhydrous form. Furthermore, a much greater range of concentrations of polypyrrolidone may be employed with respect to the formic acid, thereby resulting in the preparation of solutions which are suited to many specific needs. Numerous other advantages will be apparent to those skilled in the art from reading the instant description.

As many widely apparently different embodiments of this invention may be made without departing from the spirit and scope thereof it is to be understood that the same is not to be limited to the specific embodiments thereof except as defined in the appended claims.

I claim:
1. A new composition of matter comprising a solution of polypyrrolidone in aqueous formic acid containing from 10 to 50 percent by weight of water, said solution containing from 6 to 40 percent by weight of polypyrrolidone.
2. A new composition of matter as defined in claim 1 wherein the polypyrrolidone has a molecular weight in a range of 8500 to 500,000.
3. A new fiber-forming composition of matter comprising a solution of polypyrrolidone having a molecular weight in a range of 8500 to 500,000 dissolved in aqueous formic acid containing from 10 to 50 percent by weight of water, said solution containing 15 to 35 percent by weight of polypyrrolidone.
4. A method for preparing a new composition of matter which comprises mixing polypyrrolidone with aqueous formic acid containing from 10 to 50 percent by weight of water and maintaining the mixture at a temperature in a range of 20° C. to the boiling point of the mixture until a homogeneous solution is formed, said solution containing 6 to 40 percent by weight of polypyrrolidone.
5. The method as defined in claim 4 wherein the polypyrrolidone has a molecular weight in a range of 8500 to 500,000.
6. A method for preparing a new fiber-forming composition of matter which comprises mixing polypyrrolidone having a molecular weight in a range of 8500 to 500,000 with aqueous formic acid containing from 10 to 50 percent by weight of water and maintaining the mixture at a temperature in a range of 20° C. to the boiling point of the mixture until a homogeneous solution is formed, said solution containing 15 to 35 percent by weight of polypyrrolidone.
7. A method for preparing a new fiber-forming and film-forming composition of matter which comprises mixing 33⅓ percent, based on the total weight of the mixture, of polypyrrolidone having a molecular weight in a range of 8500 to 500,000 with aqueous formic acid containing 35 percent by weight of water, and heating said mixture at a temperature of 70° C. until a homogeneous solution is formed.

References Cited in the file of this patent
UNITED STATES PATENTS

| | | |
|---|---|---|
| 2,711,398 | Barnes et al. | June 21, 1955 |
| 2,734,043 | Crowther | Feb. 7, 1956 |
| 2,912,415 | Black et al. | Nov. 10, 1959 |